June 7, 1949.　　　　W. C. EWALDSON　　　　2,472,151
COUNTERBALANCING APPARATUS
Filed Nov. 23, 1946　　　　　　　　　　　　3 Sheets-Sheet 3
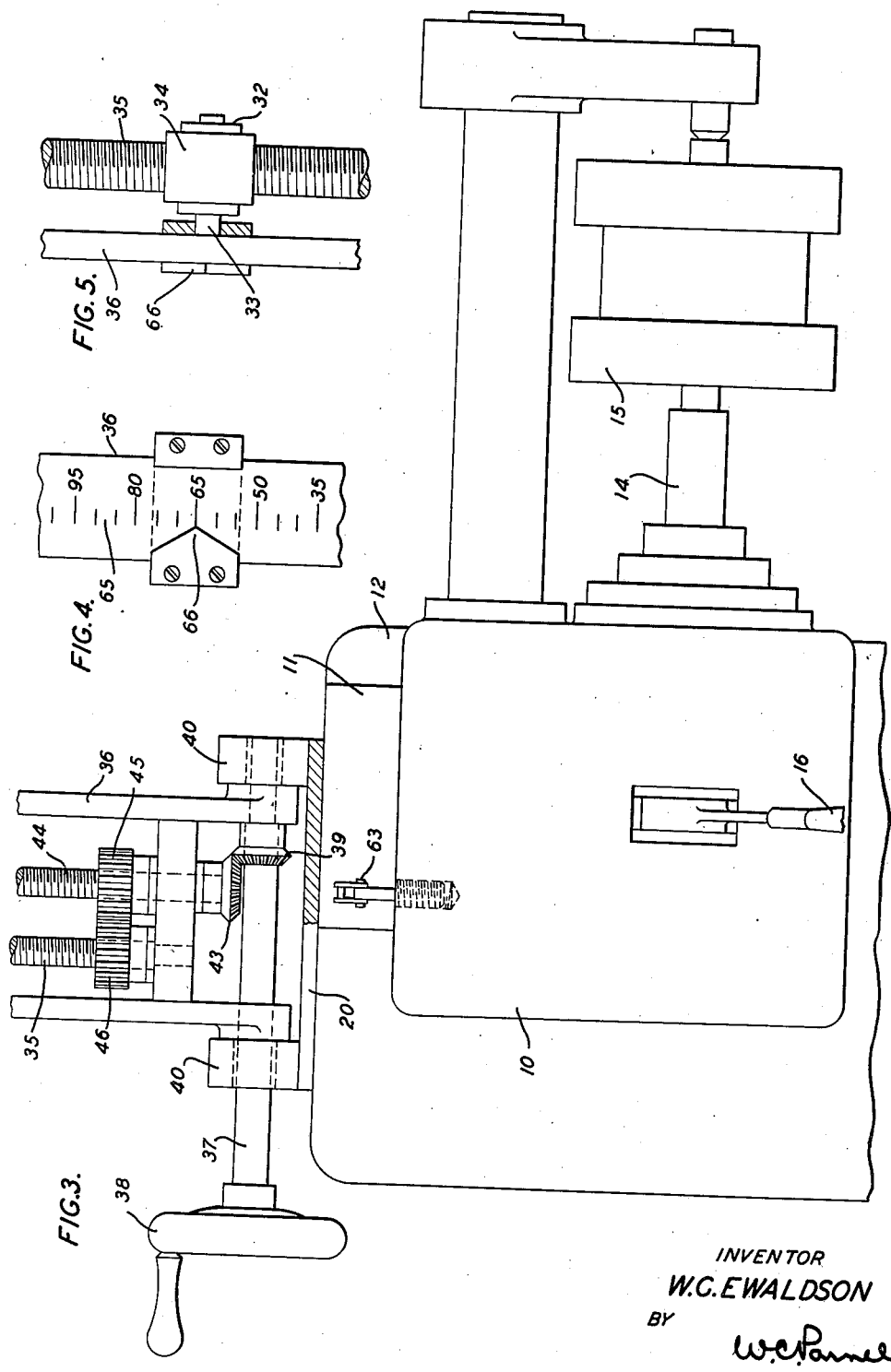
INVENTOR
W.C. EWALDSON
BY
W.C. Parnell
ATTORNEY Patented June 7, 1949

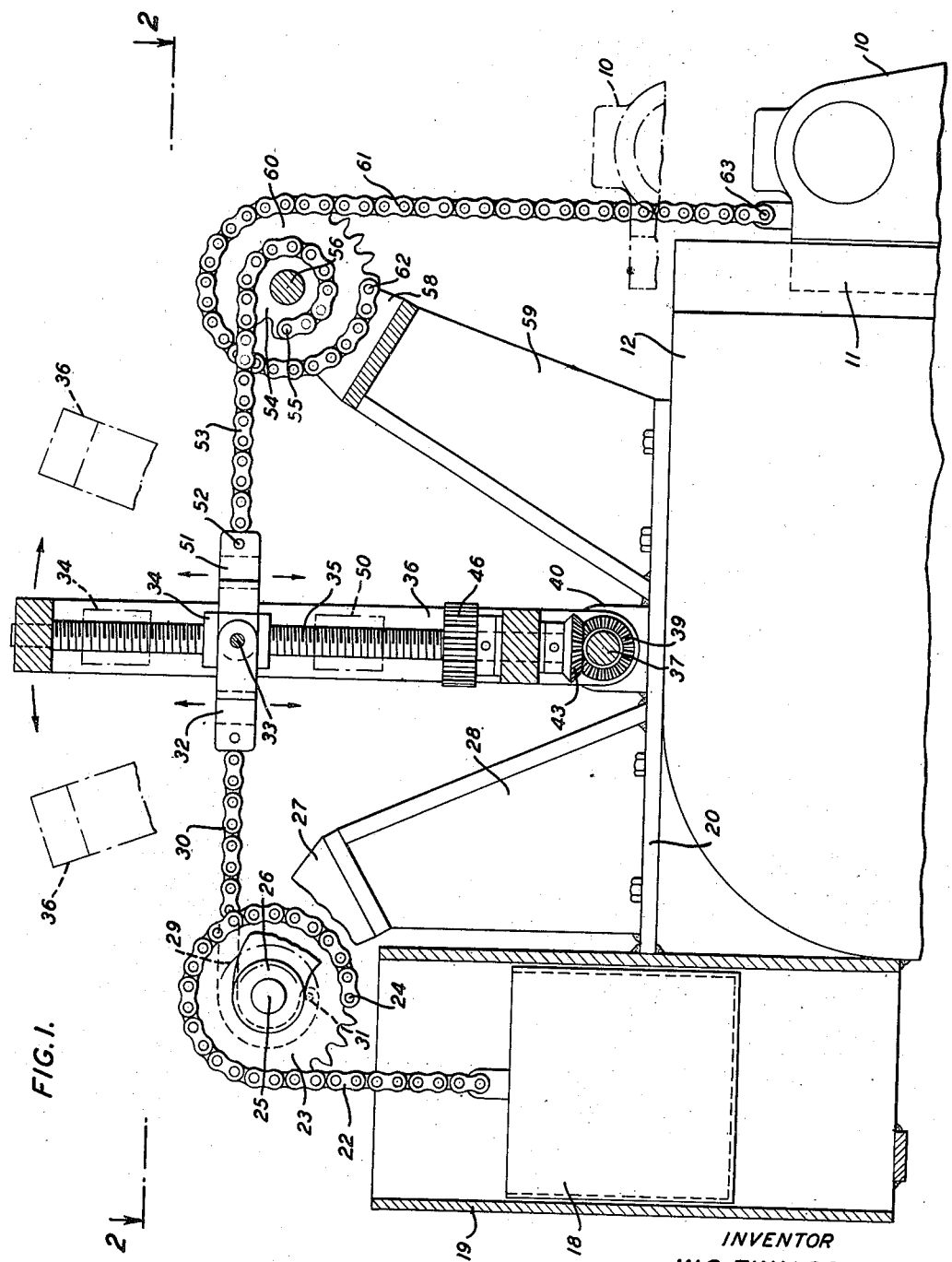

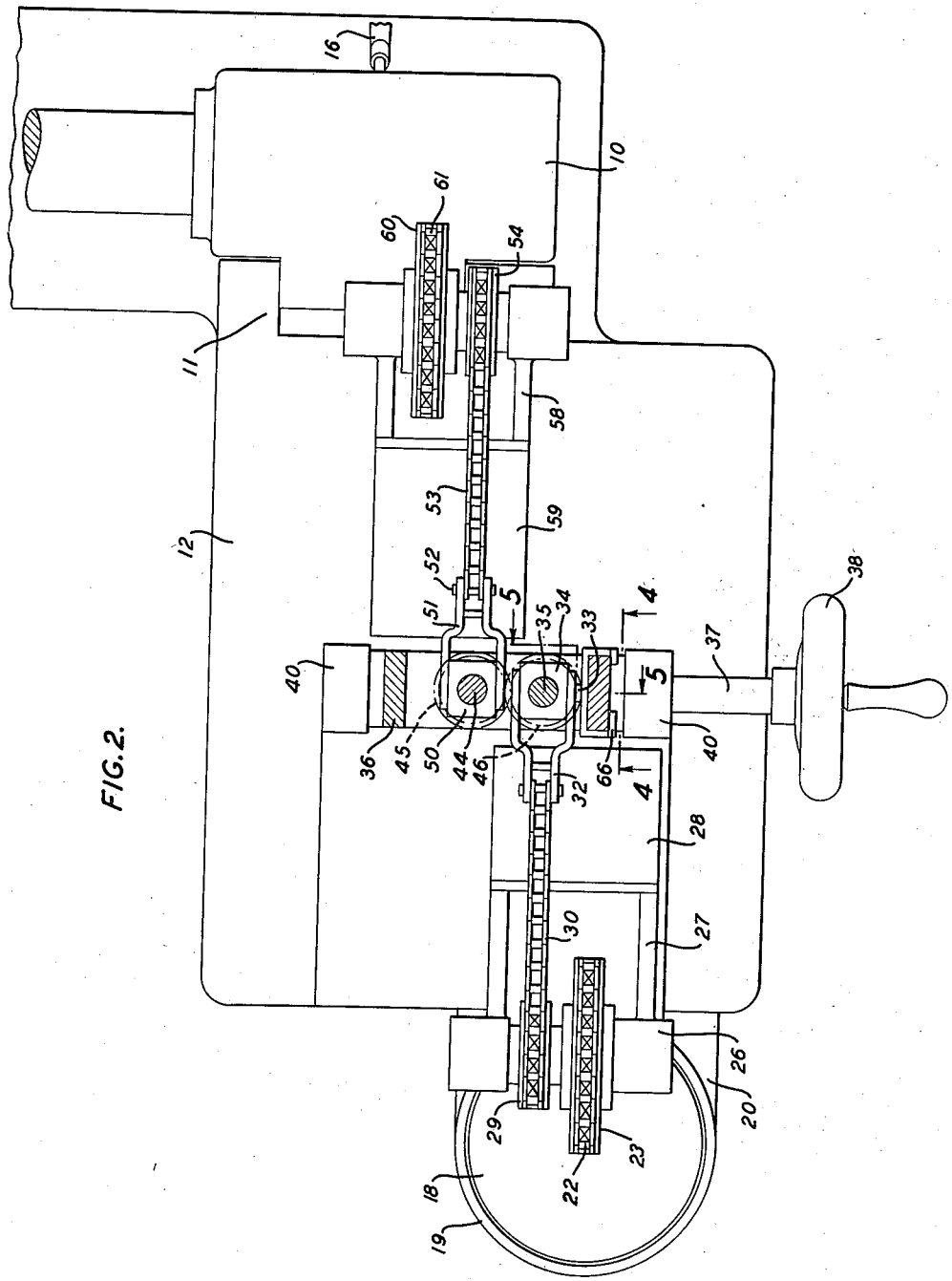

2,472,151

UNITED STATES PATENT OFFICE 2,472,151

COUNTERBALANCING APPARATUS

Waldemar C. Ewaldson, Millington, N. J., assignor to Western Electric Company, Incorporated, New York, N. Y., a corporation of New York Application November 23, 1946, Serial No. 711,915

4 Claims. (Cl. 90—11)

This invention relates to counterbalancing apparatus, and more particularly to apparatus for counterbalancing movable tool supporting units of milling machines whose weights vary with the variations in the weights of cutters mounted thereon.

Commercially known milling machines usually have counterbalancing means installed therein for counterbalancing the movable driving unit of the machine free of any tool that may be mounted on its driving spindle. These units are moved into and out of operating positions, to move the tools or cutters into and out of engagement with the work, by a hand lever movable by the operator and operating a pinion in conjunction with a stationary rack. The tools or cutters mounted upon the spindle of the unit may weigh from two to one-hundred fifty pounds, the weight of the tool added to the unit not being compensated for in the counterbalancing means present in the machine.

An object of the invention is to provide a counterbalancing apparatus which is simple in structure and readily operable to counterbalance a movable object which is variable in weight.

Broadly, the invention comprises an apparatus for counterbalancing a unit variable in weight wherein a weight is disposed at a position spaced from the unit, a control element pivotally supported between the weight and the unit, and means connecting the weight and the unit to the element at variable positions with respect to the pivotal support, depending upon the weight of the unit to render the weight effective to counterbalance the unit.

More specifically the invention is employed in conjunction with a material working machine having a tool supporting unit mounted for vertical movement relative to its work, the unit varying in weight depending upon the size of the cutter mounted thereon. The control element includes a frame pivotally supported at its lower end between the unit and the weight and includes two threaded members which are operatively connected to each other by gears whereby the driving of one member in one direction will cause the other member to be driven in the opposite direction. Sets of chains passing over sprockets connect the unit to one of the threaded members and the weight to the other threaded member. A pointer movable on one of the threaded members relative to a scale on the frame will indicate, in pounds, the added weight of the tool mounted on the spindle of the unit which the apparatus will counterbalance. The relative positions of the connections of the chains to their threaded members will vary the lengths of their respective lever arms, thus varying the counterbalancing effect of the weight with respect to the unit.

Other objects and advantages will be apparent from the following detailed description when considered in conjunction with the accompanying drawings, wherein Fig. 1 is a fragmentary side elevational view of a milling machine embodying the invention;

Fig. 2 is a sectional view taken along the line 2—2 of Fig. 1;

Fig. 3 is a fragmentary front elevational view of a portion of the structure shown in Fig. 1;

Fig. 4 is a fragmentary front elevational view of the control element, this view being taken along the line 4—4 of Fig. 2; and Fig. 5 is a fragmentary detailed sectional view taken substantially along the line 5—5 of Fig. 2.

Referring now to the drawings, a portion of a milling machine is shown to illustrate the invention. In this milling machine the conventional tool supporting unit 10 is mounted for vertical movement between its working position and its normal position on a guide 11 which is a part of the main frame 12 of the machine. The tool supporting unit includes the conventional gear reducing mechanism converting the initial speed of the motor (not shown) to the desired speed for the spindle 14 upon which the tools 15 of various sizes and weights may be singly mounted. The conventional means for bringing about vertical movement of the unit 10 includes a hand lever 16 to move a pinion (not shown) relative to a stationary rack (not shown). Although the counterbalancing mechanism (not shown) usually present in machines of this type may be present in the machine illustrated in the drawings, this mechanism counterbalances only the unit 10 with its spindle and will not counterbalance the unit when a tool has been mounted upon the spindle, regardless of the size and weight of the tool.

The counterbalancing means which embodies the invention includes a weight 18 positioned for vertical movement in a cylinder 19 which is mounted upon a bracket 20, the bracket in turn being mounted upon the main frame 12 of the machine. The weight 18 is supported by a chain 22 which extends partially around a sprocket 23 and has its upper end 24 fixed to the sprocket. The sprocket 23 is fixedly mounted upon a shaft 25 which is journalled in bearings 26 of a yoke portion 27 of one vertically extending portion 28 of the bracket 20. Another sprocket 29 smaller in diameter than the sprocket 23 is mounted upon the shaft 25 within the yoke 27. A chain 30 has one end connected at 31 to the sprocket 29 the other end being connected to a yoke 32. The yoke 32 is pivotally connected at 33 to an internally threaded follower or nut 34 which is disposed upon a threaded element 35. The element 35 has its ends rotatably supported in a frame 36, the legs of the frame being pivotally supported on a shaft 37 as illustrated in Figs. 1 and 3. The shaft 37 may be rotated relative to the frame through the aid of a hand wheel 38 to drive a beveled gear 39 which is mounted on and fixed to the shaft 37. Bearing members 40 support the shaft 37 at spaced positions and hold the frame 36 against lateral displacement. The beveled gear 39 interengages a beveled gear 43 which is mounted upon the lower end of a threaded element 44 which is similar in structure to the threaded element 35 and is rotatably supported in the frame at a position spaced from and parallel with the element 35. Gears 45 and 46 fixedly mounted upon the elements 44 and 35 respectively, operatively connect the elements so that rotation of the element 44 in one direction will rotate the element 35 in the opposite direction.

A follower 50 similar in structure to the follower 34 is disposed on the threaded element 44 and has a yoke 51 pivotally connected thereto, the free end of the yoke being connected at 52 to one end of a chain 53. The chain 53 extends about a sprocket 54 which is similar in size to the sprocket 29, the end of the chain being connected at 55 to the sprocket. The sprocket 54 is fixedly mounted upon a shaft 56 which is journalled in bearings in a yoke 58 on a vertical portion 59 of the bracket 20. A larger gear 60 similar in size to the gear 23 has a chain 61 extending therearound with its upper end connected at 62 thereto. The lower end of the chain 61 is connected at 63 to the unit 10, thus completing a connection between the unit 10 and the weight 18.

As previously described the machine selected to illustrate the invention is a milling machine in which means is present to counterbalance the unit 10 with its spindle 14 prior to the mounting of any tool on the spindle. The purpose of this invention is to compensate for the added weight of the cutter or tool 15 when mounted on the spindle to minimize the element of fatigue during movement of the unit 10 by the operator. A scale 65 computed in weight pounds, or fractions thereof, to indicate the setting of the apparatus to compensate for the added weight of the tool is disposed on one side of the frame 36 adjacent the hand wheel 38. A pointer 66 in the form of a slide extends partially around the adjacent portion of the frame 36 and is connected to the follower 34 as illustrated in Fig. 2.

When preparing the milling machine for operation, the operator selects the tool 15 desired and mounts the tool in the proper position on the spindle 14. The weight of the tool being known, the counterbalancing apparatus is adjusted until the pointer 66 registers with the indication on the scale 65 representing the number of pounds weight of the tool. This adjustment is brought about by rotation of the hand wheel 38 in the proper direction to cause movement of the follower 34 with the pointer 66 toward the indication representing the weight of the tool. Let it be assumed that, with the followers 34 and 50 in their aligning positions as shown in Fig. 1, the effective torque or pull of the weight 18 on the unit 10 will be sixty-five pounds, as indicated by the pointer in Fig. 4. If the tool 15, now mounted on the spindle 14, weighs ninety-five pounds, the shaft 37 will be rotated by the hand wheel 38 to rotate the element 44 in a direction to move its follower 50 downwardly, the gears 45 and 46 causing rotation of the element 35 to move the follower 34 upwardly until the pointer 66 has registered with the indication 95 on the scale 65. During this adjustment of the apparatus the follower 50, which connects the unit 10 with the frame 36, has been moved a given distance closer to the pivotal axis of the frame to shorten the lever arm connecting the unit 10 to the frame. At the same time the connection, embodied in the follower 34 between the weight 18 and the frame has been moved a like distance away from the pivotal axis of the frame increasing its lever arm. In this manner the weight 18 is rendered effective to counterbalance the unit 10, its pull on the frame 36 through its sprockets and chains being near the outer end of the frame with a leverage substantially double that of the connection between the frame and the unit 10 through its follower 50 and its sprocket and chain connections.

During the operation of the milling machine, the unit is moved downwardly to move the cutter 15 into engagement with the work through the operation of the handle 16. The handle is also operated in the opposite direction to move the unit away from the work. During these movements of the unit, little effort is required of the operator as the unit itself has been counterbalanced with the mechanism initially installed in the machine, the weight of the tool being counterbalanced by the apparatus. During these movements of the unit 10, the weight 18 will move in its cylinder 19 rotating the sprockets 23 and 30 and swinging the frame 36 about its pivot or shaft 37 indicated in Fig. 1.

In this embodiment of the invention, the apparatus serves as an auxiliary to a known type of counterbalancing means which is ineffective to counterbalance the tools 15 or other appreciable mass added to the unit or previously balanced structure. However, if desired, it may be used as the sole counterbalancing mechanism of a machine and in either event, its use results in an accurate counterbalancing of the whole structure to be moved even though its weight is varied over a considerable range.

Although specific improvements of the invention have been shown and described, it will be understood that they are but illustrative and that various modifications may be made therein without departing from the scope and spirit of this invention as defined by the appended claims.

What is claimed is:

1. An apparatus for counterbalancing a movable unit variable in weight, the apparatus comprising a weight disposed at a position spaced from the unit, a frame interposed between the weight and the unit, a pivotal support for the frame, threaded elements rotatably supported in the frame, internally threaded followers on the elements, means to connect one of the followers to the unit, means to connect the other follower to the weight, and means to rotate the threaded elements to vary the positions of their followers relative to the pivotal support with variations in the weight of the unit to render the weight effective to counterbalance the unit.

2. An apparatus for counterbalancing a movable unit variable in weight, the apparatus comprising a weight disposed at a position spaced from the unit, a frame interposed between the weight and the unit, a rotatable shaft pivotally supporting the frame, threaded elements rotatably supported in the frame, internally threaded followers on the elements, means to connect one of the followers to the unit, means to connect the other follower to the weight, and means rotated with the shaft to rotate the elements to vary the positions of the followers relative to the shaft with variations in the weight of the unit to render the weight effective to counterbalance the unit.

3. An apparatus for counterbalancing a movable unit variable in weight, the apparatus comprising a weight disposed at a position spaced from the unit, a frame interposed between the weight and the unit, a pivotal support for the frame, threaded elements rotatably supported in the frame, internally threaded followers on the elements, means to connect one of the followers to the unit, means to connect the other follower to the weight, means to rotate the threaded elements to vary the positions of their followers relative to the pivotal support with variations in the weight of the unit to render the weight effective to counterbalance the unit, and means actuable by the relative movement of the followers to indicate the amount of the load added to the unit which the weight will counterbalance.

4. An apparatus for counterbalancing a movable unit variable in weight, the apparatus comprising a weight disposed at a position spaced from the unit, a frame interposed between the weight and the unit, a scale indicating pounds weight disposed on the frame, a pivotal support for the frame, threaded elements rotatably supported in the frame, internally threaded followers on the elements, means to connect one of the followers to the unit, means to connect the other follower to the weight, and a pointer movable with one of the followers relative to the scale to indicate the amount of the load added to the unit which the weight will counterbalance.

WALDEMAR C. EWALDSON.

REFERENCES CITED

The following references are of record in the file of this patent:

UNITED STATES PATENTS

| Number | Name | Date |
|--------|------|------|
| 204,248 | Pond | May 28, 1878 |